May 17, 1960 T. L. THOURSON ET AL 2,937,275
METAL DETERMINATION BY RADIATION ABSORPTION
Filed March 6, 1956 3 Sheets-Sheet 3
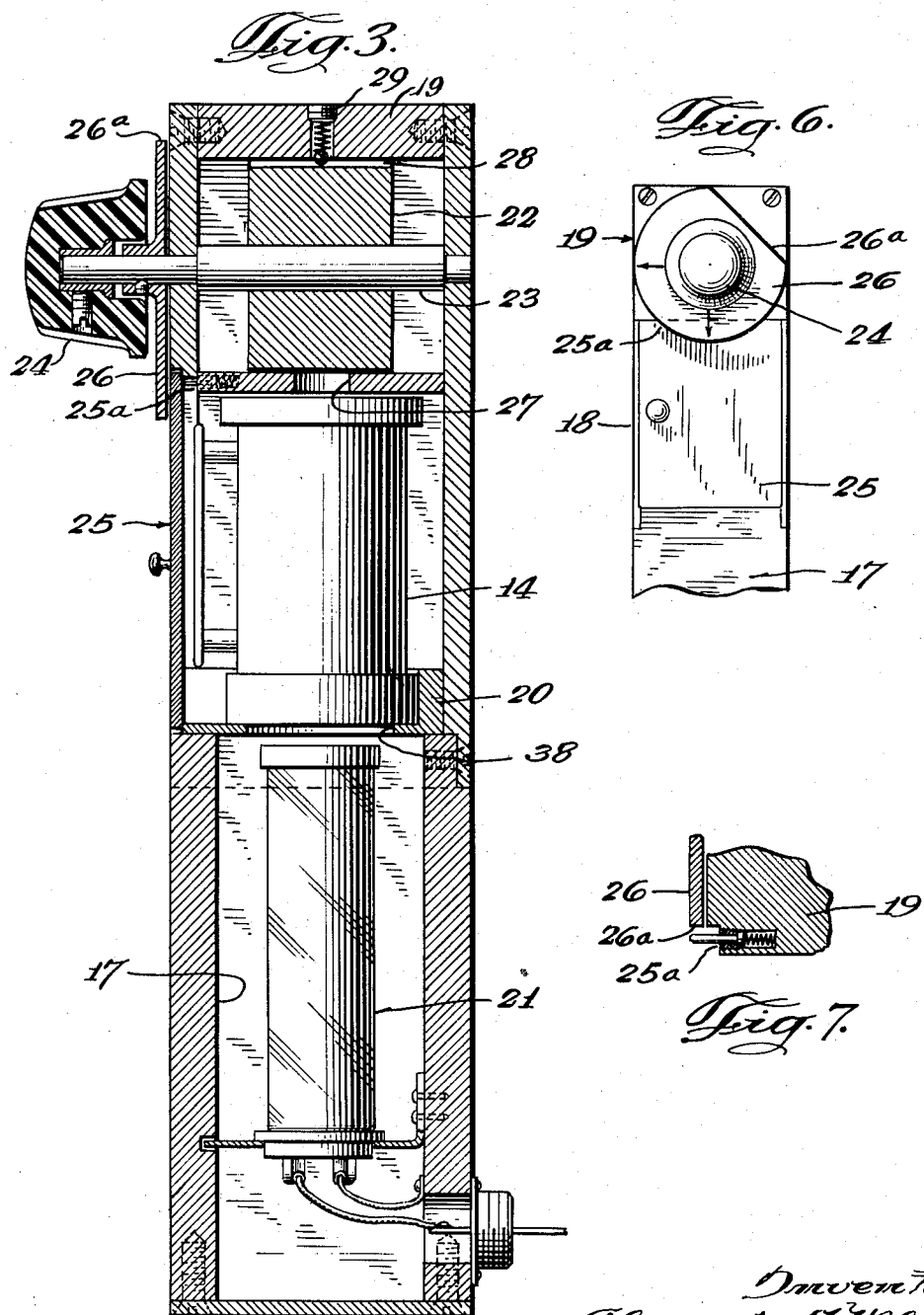

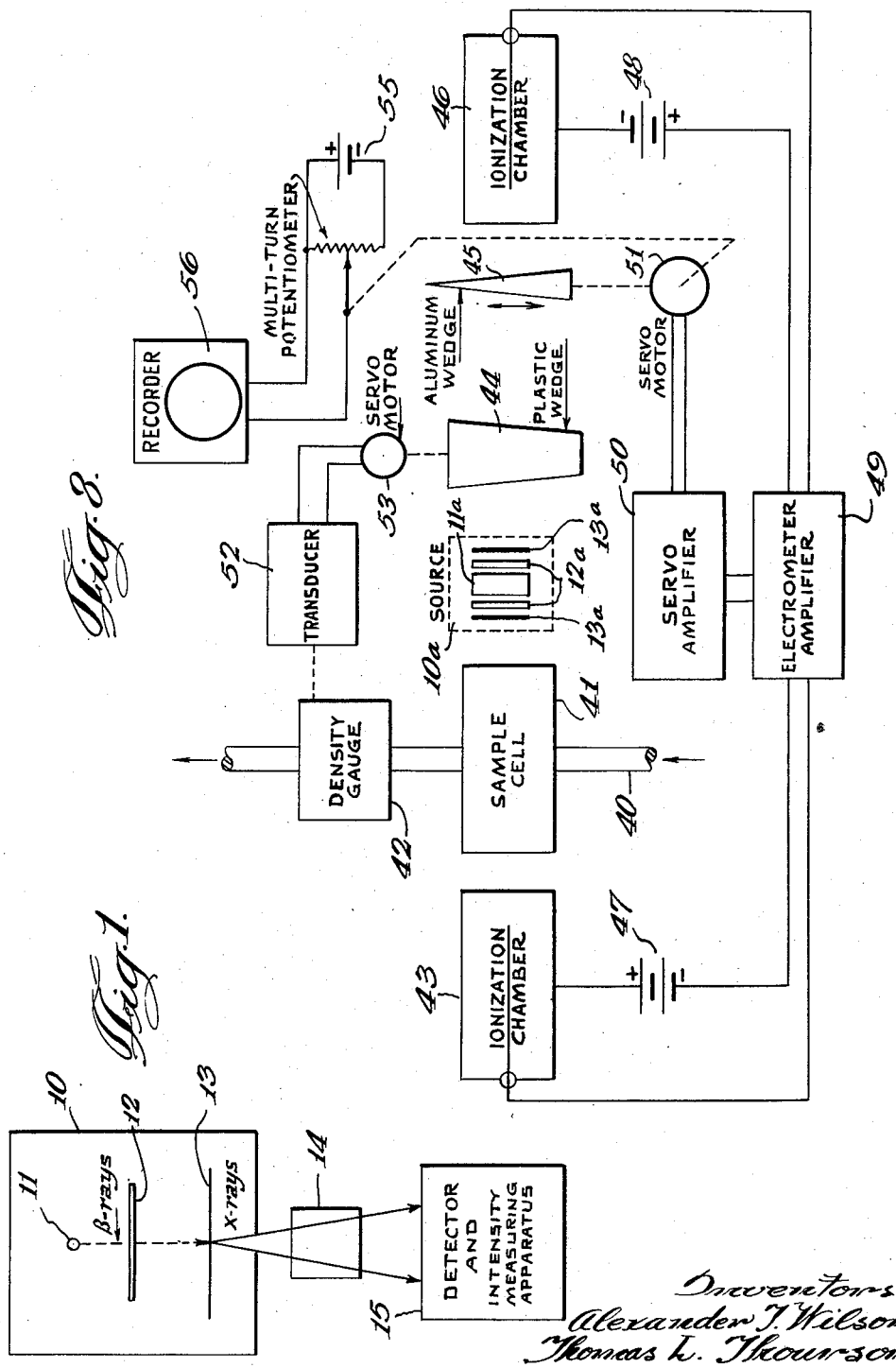

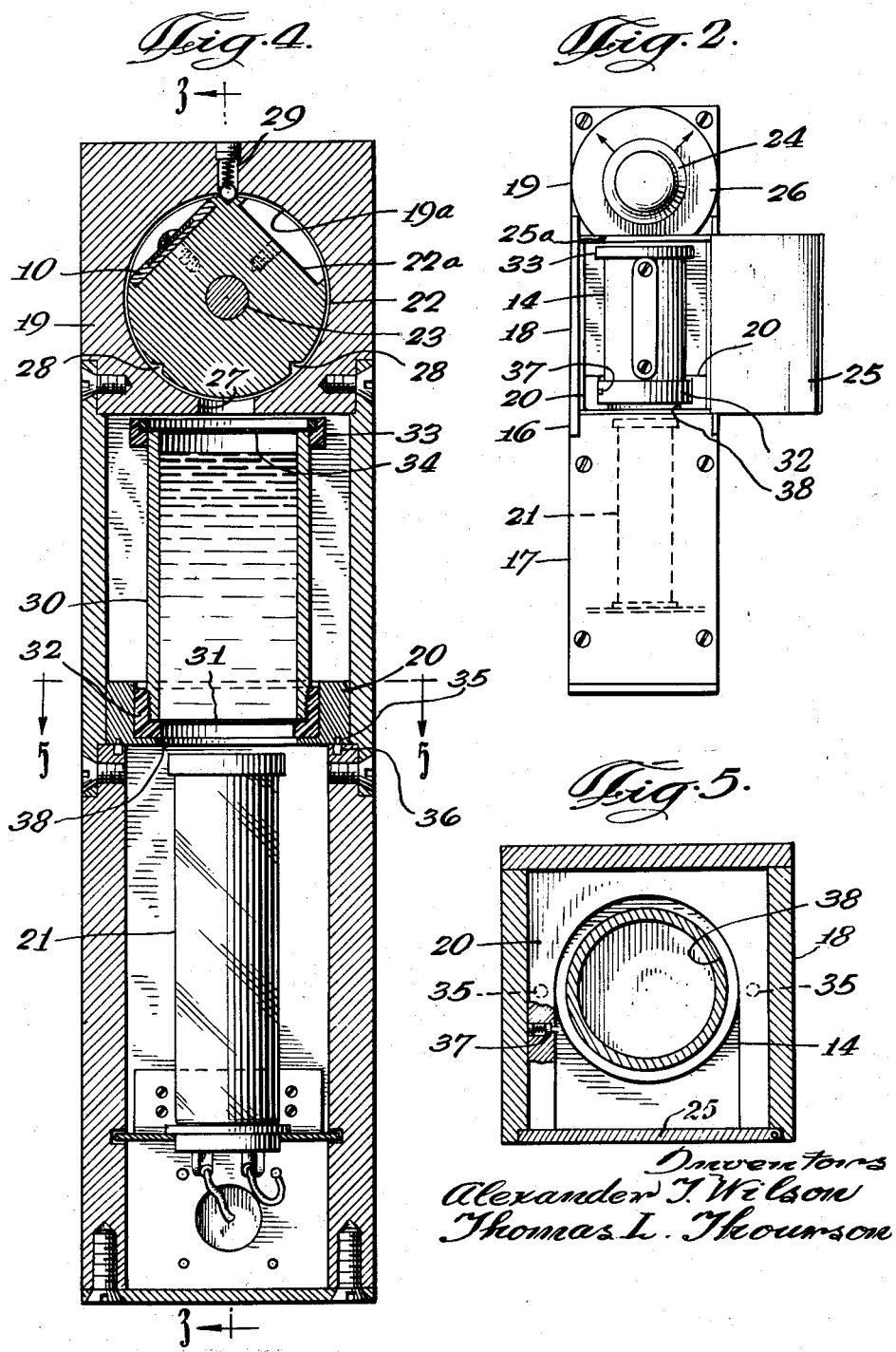

United States Patent Office 2,937,275
Patented May 17, 1960

2,937,275

METAL DETERMINATION BY RADIATION ABSORPTION

Thomas L. Thourson, Park Forest, Ill., and Alexander T. Wilson, Whiting, Ind., assignors to Standard Oil Company, Chicago, Ill., a corporation of Indiana Application March 6, 1956, Serial No. 569,908

7 Claims. (Cl. 250—43.5)

This invention relates to quantitative analysis by means of X-ray absorption and, more particularly, relates to a system for quantitatively determining the concentration of tetraethyllead fluid in gasoline.

Analytical techniques have been proposed heretofore for such determinations but such techniques have required relatively complicated and expensive equipment, or are time consuming, and are not readily adapted to routine analysis. However, there is an ever increasing need for plant quality control devices and it is a primary object of this invention to provide a system which is adapted for use in the continuous determination of the concentration of tetraethyllead (TEL) in a flowing stream of leaded gasoline.

Another object of the invention is to provide an improved method and apparatus particularly adapted for rapid and routine analysis of elements of high atomic weight in a matrix of low atomic weight. Another object of our invention is to provide an apparatus and method for the analysis of the concentration of tetraethyllead in gasoline without the necessity for preparing extracts of the gasoline and without calculations and plotting of graphs and charts. These and other objects of our invention will become apparent as the description thereof proceeds.

Briefly, we attain the objects of our invention by providing a system which is based upon the relatively large absorption by atomic lead of the X-rays produced when beta particles from strontium 90 bombard a thin molybdenum foil; the X-rays from the strontium 90-molybdenum foil source being passed through a leaded sample of gasoline. As the X-rays pass through the sample, they will be absorbed, in part, by the gasoline, by the tetraethyllead, and by any other components present; thus in view of the relatively large absorption by atomic lead the greater the concentration of tetraethyllead in the sample, the greater will be the absorption of the X-rays. Therefore, the intensity of the transmitted X-rays is a function of the tetraethyllead concentration of the sample, which concentration can be determined by measuring the transmitted X-ray intensity.

Inasmuch as the transmitted X-rays are absorbed in part by the gasoline or other hydrocarbons present, the transmitted X-ray measurement is sensitive to the varying carbon to hydrogen ratio of different base stocks. We eliminate the sensitivity to the carbon to hydrogen ratio by producing X-rays whose effective wave length is about 0.6 A. X-rays whose wave lengths are shorter than about 0.6 A. are produced by the more energetic beta particles from the strontium 90 and we can reduce the beta particle energy by interposing an attenuator composed of low atomic number elements such as carbon between the strontium 90 and the molybdenum foil target.

To permit a continuous determination in terms of volume concentration in different base stocks, it is necessary that a density correction be made. This can be done automatically by employing a density gauge and transducer, the output signal of which may be supplied to a computer or may be used to adjust the position of a compensating wedge in the X-ray beam.

Further details of construction and advantages of our system will be given in conjunction with the description of the accompanying drawings illustrating preferred embodiments of the invention and wherein:

Figure 1 is a schematic diagram of an apparatus employing our X-ray source;

Figure 2 is a front elevation;

Figures 3 and 4 are vertical sections of the apparatus of Figure 2;

Figure 5 is a section taken along 5—5 in Figure 4;

Figure 6 is a fragmentary view of the apparatus of Figure 2;

Figure 7 is an enlarged detail of elements in Figure 2; and

Figure 8 is a schematic diagram of a second embodiment of our invention applied to a continuous system and including means for making a density correction.

Referring to the drawings, the X-ray source 10 comprises a beta ray emitter 11 which is a radio isotope such as strontium 90, a beta ray attenuator 12, and a foil target 13 from which the X-rays are emitted. The beam from the source 10 is passed through the sample cell 14 and the transmitted X-ray intensity measured by the detector, and associated current measuring or pulse counting circuitry represented by 15. The current measuring means may comprise an ionization chamber and the pulse counter a Geiger tube. Circuits including such components are well known to the art and will not be described in detail herein.

Referring to Figures 2 to 7, the housing 16 includes three compartments: the detector tube shield W17, the sample cell chamber 18, and the radiation source housing 19. The sample cell chamber 18 is provided with an indexed holder 20 for positioning the sample cell 14 in alignment with the radiation source 10 and the detector 21.

The shield or housing 19 for the source 10 encloses a rotatable body 22 provided with shaft 23. Within the body 22 is disposed the source 10 which is comprised of the beta ray emitter 11 and the foil target 13. A knob 24 is provided for rotating the shaft 23 supporting the body 22 within the shield 19 so as to expose the radiation source 10 to the sample cell 14.

The sample chamber 18 is provided with a door 25. The shaft 23 for rotating the radiation source body 22 carries a rotatable disc 26 having a chordal section cut away to permit the opening of the door 25 only when the radiation source 10 is in its shielded position. To prevent exposing the source 10 within the rotatable body 22 if the door 25 has not been closed we may provide a recessed and spring loaded pin means 25a. When the door 25 is closed, however, the pin 25a is displaced and the disc 26 is free to rotate over the outer surface of the door 25.

The X-ray source 10, comprising the $Sr^{90}$ beta ray emitter 11 and the molybdenum foil target 13, is mounted within recess 22a in the rotatable body 22. This body in turn is disposed in a close fitting bore 19a within the shield or housing 19. The shield 19, the body 22, and the housing 16 are constructed of material, such as stainless steel, which is relatively impervious to the beta rays.

It will be understood that when the instrument is not in use or when the sample cell 14 is being introduced or removed from the sample cell chamber 18, the source 10 is retained within the upper part of the housing or shield 19. To indicate the position of the source we provide an index on the disc 26 and also provide positive stop means 28 and 29 carried by the rotatable body 22 and the fixed shield 19, respectively.

The sample cell 14 is comprised of a metal body 30, an aluminum foil 31 at the bottom, a threaded ring 32 for holding the aluminum window in place and a top cap 33 comprising an aluminum foil sheet 34, and a plastic ring in vapor tight contact with the top of the cell. The sample cell holder 20 fits into the sample cell chamber 18 and is provided with two fixed pins 35 which fit into matching holes 36 in the top of the detector shield 17. The curvature of the back wall of the sample cell holder 20 matches the curvature of the sample cell 14, this curvature along with a spring load pin means 37 in the sample cell holder 20 provides exact and reproducible positioning of the sample cell 14. The base of the holder 20 is provided with a port 38 which is aligned with the sample cell window 31 and the port 27 in the shield 19.

After the sample cell 14 is in place, and the sample chamber door 25 is closed, the source holder 22 is rotated by means of the knob 24 on the front of the housing 19 until the source 10 and target 13 are opposite a port 27 in the bottom of the housing 19. With the source 10 in this position, the safety stop disc 26, which is attached to the knob shaft 23, prevents the sample chamber door 25 from being opened. X-rays from the source 10 can then pass through the sample cell 14.

The detector tube shield 17 encloses a suitable detector means such as a Geiger Mueller tube 21 which is connected with conventional counting and high voltage equipment. We prefer to use a Geiger Mueller tube which possesses a thin aluminum end window to pass soft radiation and should contain argon and krypton as the filling gas, these gases being efficient absorbers of soft radiation. The Geiger Mueller tube should be mounted so that the end window is exposed to the transmitted radiation.

Referring to Figure 8, we have schematically illustrated another embodiment of our invention which is adapted for use on a continuous flowing stream bed. The product flows through a by-pass sample line 40 containing the sample cell 41 and a density gauge 42. The sample cell 41 corresponds to sample cell 14 in Figure 1 and a double faced X-ray source 10$a$ is provided. The beta ray emitter 11$a$ is preferably a two-sided strontium 90 source prepared in accordance with U.S. Patent 2,700,111. On each side of the source 11$a$ is a molybdenum target 13$a$. Radiation from one side of the source 11$a$ is transmitted through the sample in sample cell 41 to an ionization chamber 43. Radiation from the opposite side of the source 11$a$ passes through a standard plastic wedge 44, and an aluminum wedge 45 to a second ionization chamber 46.

The current from the two ion chambers 43 and 46 are matched in opposition, each being provided with a high voltage D.C. power supply 47 and 48 which are of opposite polarity. The difference current from the ion chambers 43 and 46 is fed to a conventional and commercially available electrometer amplifier 49. The output current from the electrometer amplifier 49 is fed to a servo amplifier 50 which in turn is connected to the servo motor 51 for positioning the aluminum wedge 45 in the beam from the source 10$a$ until the current from the two ion chambers 43 and 46 are equal. The TEL content of the sample within sample cell 41 is then determined from the position of the aluminum wedge 45. Also connected to the shaft of the servo motor 51 is the slide wire of a linear multi-turn potentiometer 54 and connected across the end terminals of the potentiometer is a constant D.C. voltage supply 55. The voltage between the slide wire and one of the end terminals corresponds to the position of the aluminum wedge 45. This voltage is fed to a suitable recorder 56 which is calibrated in terms of cc.'s of tetraethyllead per gallon of sample gasoline.

A density correction can be made and a preferred system for so doing is illustrated in Figure 8. A density gauge 42 is attached to the sample line 40 adjacent the sample cell 41. The displacement of a float in the mechanical density gauge 42 displaces the armature of the transducer 52 thereby providing an electrical signal which may be utilized in controlling the servo motor 53, which in turn, through a suitable mechanical linkage positions the plastic absorber wedge 44. The D.C. signal from the transducer 52 is a function of the density of the sample undergoing analysis.

Reverting to the transmission-type targets, we prefer to use molybdenum foil having a thickness of about .001 inch to about .005 inch. In the embodiment of Figures 2 to 7 the foil was about .001 inch. In general, for a given thickness targets of silver foil are comparable to foils of molybdenum. It is also contemplated that metals lying near and between silver and molybdenum in the periodic table and/or combinations of such elements in the form of alloys or laminations can be used as the target. Similarly, salts or other chemical compounds of these elements may be useful in certain applications of our technique.

Determinations of tetraethyllead in gasoline samples have been made employing the apparatus illustrated in Figures 2 to 7 inclusive with the beta ray emitter 11 comprising a 13.5 millicurie $Sr^{90}$ source, a 0.001 inch molybdenum target 13, and a krypton filled Geiger tube 21. The overall dimensions of our housing 16 are about 12.75 inches by 3.25 inches by 3.25 inches.

The results obtained were compared with concentrations determined by the conventional X-ray photometric apparatus which uses an X-ray tube and high voltage generating equipment. Our values differed from the "true" values by an average of 0.04 cc. TEL/gallon which is about the probable error of the X-ray tube method. However, our apparatus is much less expensive, and is readily portable as compared to the X-ray tube apparatus; in addition our system has the advantages of rapidity and simplicity over the wet chemical methods of analysis.

Although we have described the invention in terms of specific examples and operations which have been set forth in some detail, it is to be understood that these are by way of illustration only and that our invention is not limited thereto. Alternative embodiments of apparatus and variations in operating techniques will become apparent to those skilled in the art in view of our disclosure. Accordingly, modifications in the invention and the mode of using the apparatus are contemplated without departing from the spirit thereof.

What we claim is:

1. An apparatus for producing X-rays comprising a housing, said housing being relatively impervious to beta rays and X-rays, at least one window in said housing, a beta ray emitter within said housing, and a beta ray attenuator, a metal foil target interposed said emitter and said window, whereby beta rays impinge on said target and X-rays emanating therefrom through said window have a wave length of about 0.6 A.

2. The apparatus of claim 1 wherein the beta ray emitter is strontium 90, the attenuator comprises an element of low atomic number, and the metal foil target comprises molybdenum.

3. An apparatus for determining the volumetric concentration of tetraethyllead fluid in a gasoline sample independently of variations in gasoline composition which comprises means for confining such sample in a cell having aluminum foil windows, radiation source means for generating X-rays insensitive to the carbon to hydrogen ratio and having an effective wave length of about 0.6 A., said last-named means comprising a radioisotope, a beta ray attenuator of a low atomic number element, and a metal foil target, means for passing the generated X-rays from said radiation source means through said aluminum foil windows in said cell, and detector means for determining the X-ray absorption coefficient of said sample in said cell as an indication of the concentration of tetraethyllead fluid in the gasoline sample.

4. An apparatus for quantitatively determining the concentration of tetraethyllead in gasoline which comprises a source of X-rays, said source comprising a beta ray emitter consisting of a shield means, a radioisotope within said shield means, beta ray attenuator means, and a metal foil target emitting the X-rays, detector means for X-rays, and sample cell means interposed said source and said detector means.

5. The apparatus of claim 4 wherein the radioisotope is strontium 90, the beta ray attenuator is carbon, and the metal foil target is molybdenum.

6. The method for quantitatively determining volumetric concentration of tetraethyllead fluid in a gasoline sample which comprises the steps of generating X-rays having a wave length of about 0.6 A. produced from a radioisotope and metal foil target source, exposing the sample to the generated X-rays of such wave length, and determining the X-ray absorption coefficient of the exposed sample as a measure of the concentration of tetraethyllead in the gasoline sample.

7. In the method of metal determination by radiation absorption the improvement which comprises generating X-rays by bombarding a thin molybdenum foil with beta particles from a strontium 90 source, subjecting a sample containing the metal to be analyzed to generated X-rays having a wave length of about 0.6 A, such rays being insensitive to variations in carbon to hydrogen ratio of the sample, and measuring the transmitted X-ray intensity as an indication of the concentration of the metal in the sample, the intensity of the transmitted X-rays being a function of the metal concentration.

References Cited in the file of this patent

UNITED STATES PATENTS

| | | |
|---|---|---|
| 2,722,609 | Morgan et al. | Nov. 1, 1955 |
| 2,757,290 | Jacobs et al. | July 31, 1956 |

OTHER REFERENCES

"Beta-Ray-Excited Low-Energy X-Ray Sources," by L. Reiffel, from Nucleonics, vol. 13, No. 3, March 1955, pages 22, 23 and 24.